United States Patent
Yang et al.

(10) Patent No.: US 7,008,710 B2
(45) Date of Patent: *Mar. 7, 2006

(54) FUEL CELL SYSTEM WITH AIR COOLING DEVICE

(75) Inventors: Jefferson YS Yang, Orange, CA (US); Yao-Sheng Hsu, Taipei (TW)

(73) Assignee: Asia Pacific Fuel Cell Technologies, Inc., Taipei (TW)

( * ) Notice: Subject to any disclaimer, the term of this patent is extended or adjusted under 35 U.S.C. 154(b) by 365 days.

This patent is subject to a terminal disclaimer.

(21) Appl. No.: 10/414,090

(22) Filed: Apr. 16, 2003

(65) Prior Publication Data

US 2003/0198848 A1 Oct. 23, 2003

(30) Foreign Application Priority Data

Apr. 18, 2002 (TW) ................ 91107939 A

(51) Int. Cl.
*H01M 8/04* (2006.01)
(52) U.S. Cl. ................ 429/25; 429/26; 429/17
(58) Field of Classification Search ................ 429/17, 429/25, 22, 26
See application file for complete search history.

(56) References Cited

U.S. PATENT DOCUMENTS

| | | | | |
|---|---|---|---|---|
| 5,059,494 A | * | 10/1991 | Vartanian et al. | 429/17 |
| 5,082,752 A | * | 1/1992 | Koga et al. | 429/20 |
| 5,084,363 A | * | 1/1992 | Reiser | 429/19 |
| 6,500,573 B1 | * | 12/2002 | Simazu et al. | 429/22 |
| 6,663,900 B1 | * | 12/2003 | DeFreitas et al. | 424/492 |
| 2003/0203258 A1 | * | 10/2003 | Yang et al. | 429/25 |

* cited by examiner

*Primary Examiner*—Patrick Joseph Ryan
*Assistant Examiner*—Thomas H. Parsons
(74) *Attorney, Agent, or Firm*—Rosenberg, Klein & Lee

(57) ABSTRACT

A fuel cell system includes a fuel cell stack, an air supply system including a blower for driving the air to the fuel cell stack and an air humidifier for humidifying the air supplied to the fuel cell stack, a hydrogen supply system including a hydrogen storage and a pressure regulating device, and a hydrogen recirculator for receiving excessive hydrogen from the fuel cell stack and forcing the hydrogen back into the fuel cell stack in order to induce a hydrogen flow inside the fuel cell stack. A control circuit electrically controls the flow and pressure regulating device for regulating the hydrogen flow to the fuel cell stack and electrically controls the blower to regulate the air flows to the fuel cell stack and the air humidifier.

11 Claims, 7 Drawing Sheets

FUEL CELL SYSTEM WITH AIR COOLING DEVICE

BACKGROUND OF THE INVENTION

1. Field of the Invention

The present invention relates generally to a fuel cell system, and in particularly to a fuel cell system comprising an air cooling device for improving performance thereof.

2. Description of the Prior Art

Fuel cell power system is capable of generating electrical power energy by means of electro-chemical reaction between a fuel, such as hydrogen and methanol, and an oxidizer, such as oxygen. Based on the electrolyte thereof, the fuel cell is classified as proton exchange membrane fuel cell or polymer electrolyte membrane fuel cell, abbreviated as PEMFC or PEM, alkaline fuel cell (AFC), phosphoric acid fuel cell (PAFC), molten carbonate fuel cell (MCFC) and solid oxide fuel cell (SOFC).

Among these known fuel cells, the PEMFEC is the best-developed technique, having the advantages of low operation temperature, fast start-up and high power density. Thus, the PEMFC is very suitable for transportation vehicles and power generation systems, such as home power systems and other portable and stationary power generation systems.

Fuel cell of power smaller than 1 kilo-watt usually comprises an air cooling device. FIG. 1 of the attached drawings shows an example of conventional power fuel cell systems comprising a fuel cell stack 102. Air containing oxygen is drawn in by an air pump 104, and hydrogen stored in a hydrogen canister 110 is conveyed through a solenoid valve 106 and a pressure regulator 108 to the fuel cell stack 102. The electrochemical reaction between the hydrogen and oxygen generates electricity with water and heat as byproducts of the reaction. The heat generated subsequently causes the rise of a temperature of the fuel cell stack 102. When the temperature of the fuel cell stack 102 rises too high, a cooling fan 112 is driven to turn on for cooling.

FIG. 2 shows a perspective view of a conventional fuel cell comprises a cooling fan. The fuel cell stack 102 includes a plurality of fuel cell units 202, each of which comprises an anode plate, a cathode plate, a membrane electrode assembly (MEA), and two gas diffusion layers at the two sides of MEA. Two adjacent cell units 202 sandwich a cooling plate 204 which comprises a plurality of parallelly arranged air grooves 206. When the fuel cell stack 102 reaches a high temperature, the cooling fan 112 is driven to turn on and cooling air is drawn into the grooves 206. The cooling air absorbs and carries away the heat inside the fuel cell stack 102. Subsequently, the temperature of fuel cell stack 102 is decreased.

The electro-chemical reaction between hydrogen and oxygen is highly improved in suitable moisturized condition. Accordingly, the temperature of the fuel cell stack 102 should be maintained at below 40~60° C., otherwise, there may be insufficient water and reaction rate is low. Therefore, when the fuel cell stack reaches a temperature higher than 40~60° C., the cooling fan 112 is driven to turn on for cooling. However, the cooling fan 112 can only generate cooling air of low pressure and velocity, and the cooling effect is poor. Therefore, the fuel cell stack 102 is not capable to work at heavy load and provide large working current. Moreover, an extra space is required for the placement of the cooling fan 112.

Furthermore, to promote the electrochemical reaction between oxygen and hydrogen, a solenoid valve 106 and a pressure regulator 108 control the flowing of hydrogen to the fuel cell stack 102. Such a regulation limits the utility of hydrogen.

It is thus desired to provide a fuel cell system that overcomes the above-discussed disadvantages of the prior art. The present invention provides a fuel cell system with an air cooling device, which enables the fuel cell stack to work at higher temperature while it does not require a cooling fan for cooling.

SUMMARY OF THE INVENTION

Thus, an object of the present invention is to provide a fuel cell power system which comprises a fuel cell stack, an air humidifier, a blower, a hydrogen storage, a flow and pressure regulator, a hydrogen recirculator and a control circuit. The air humidifier humidifies the air supplied to the fuel cell stack with the humidity from the fuel cell stack, the blower drives the air containing oxygen to the air humidifier and fuel cell stack, the hydrogen storage stores and supplies hydrogen to the fuel cell stack, a flow and pressure regulating device regulates the hydrogen flow, the hydrogen recirculator receives excessive hydrogen from the fuel cell stack and circulates the hydrogen back into the fuel cell stack, and the control circuit electrically controls the flow and pressure regulating device and the blower.

To achieve the above objects, in accordance with the present invention, there is provided a fuel cell system which is capable of humidifying and supplying the air to fuel cell stack, so that even when the working temperature rises, there is sufficient moisture in the fuel cell stack for performing electro-chemical reaction at high rate. It enables the fuel cell stack to work at heavy load and provide large working current. Moreover, the fuel cell stack does not require a cooling fan for cooling, and production cost and space are greatly saved. Furthermore, unreacted and excessive hydrogen is recirculated to the fuel cell system. By this means, the utility of hydrogen is highly enhanced.

BRIEF DESCRIPTION OF THE DRAWINGS

The present invention will be apparent to those skilled in the art by reading the following description of a number of preferred embodiments thereof, with reference to the attached drawings, in which.

DETAILED DESCRIPTION OF THE PREFERRED EMBODIMENTS

Figure 1:
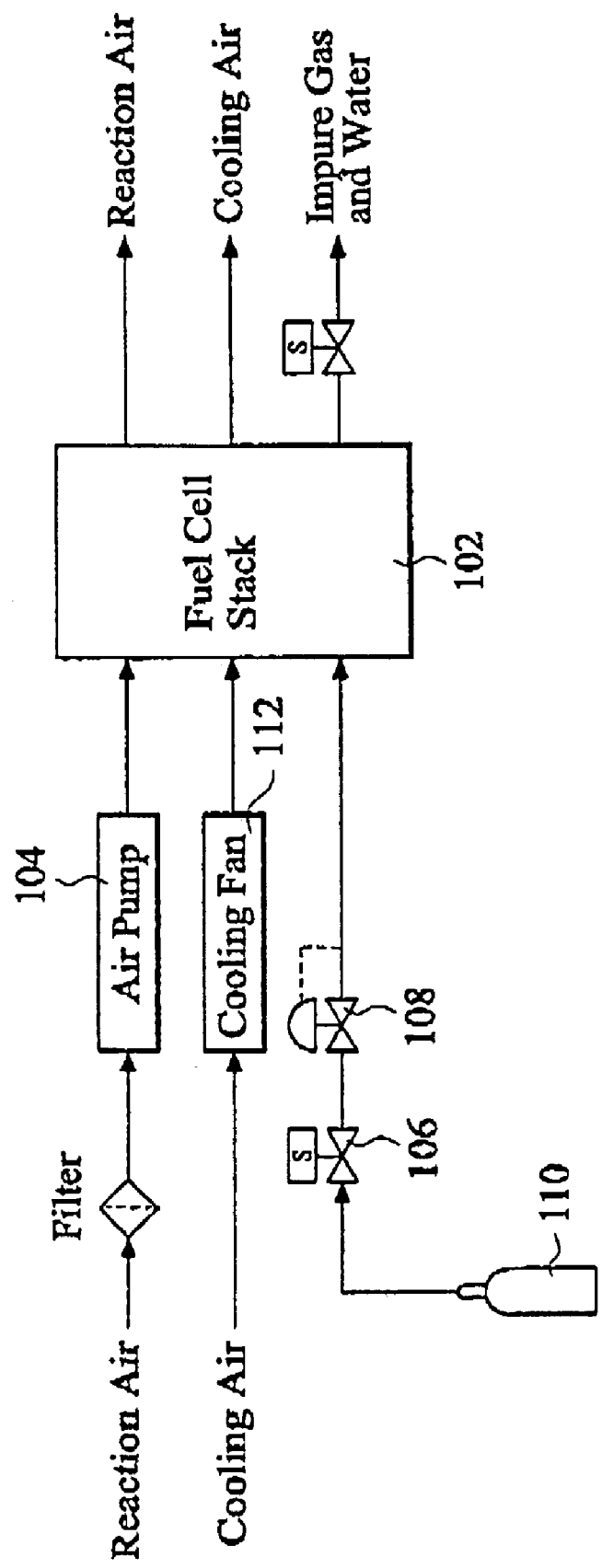
FIG. 1 is a system block diagram of a conventional fuel cell system.
Figure 2:
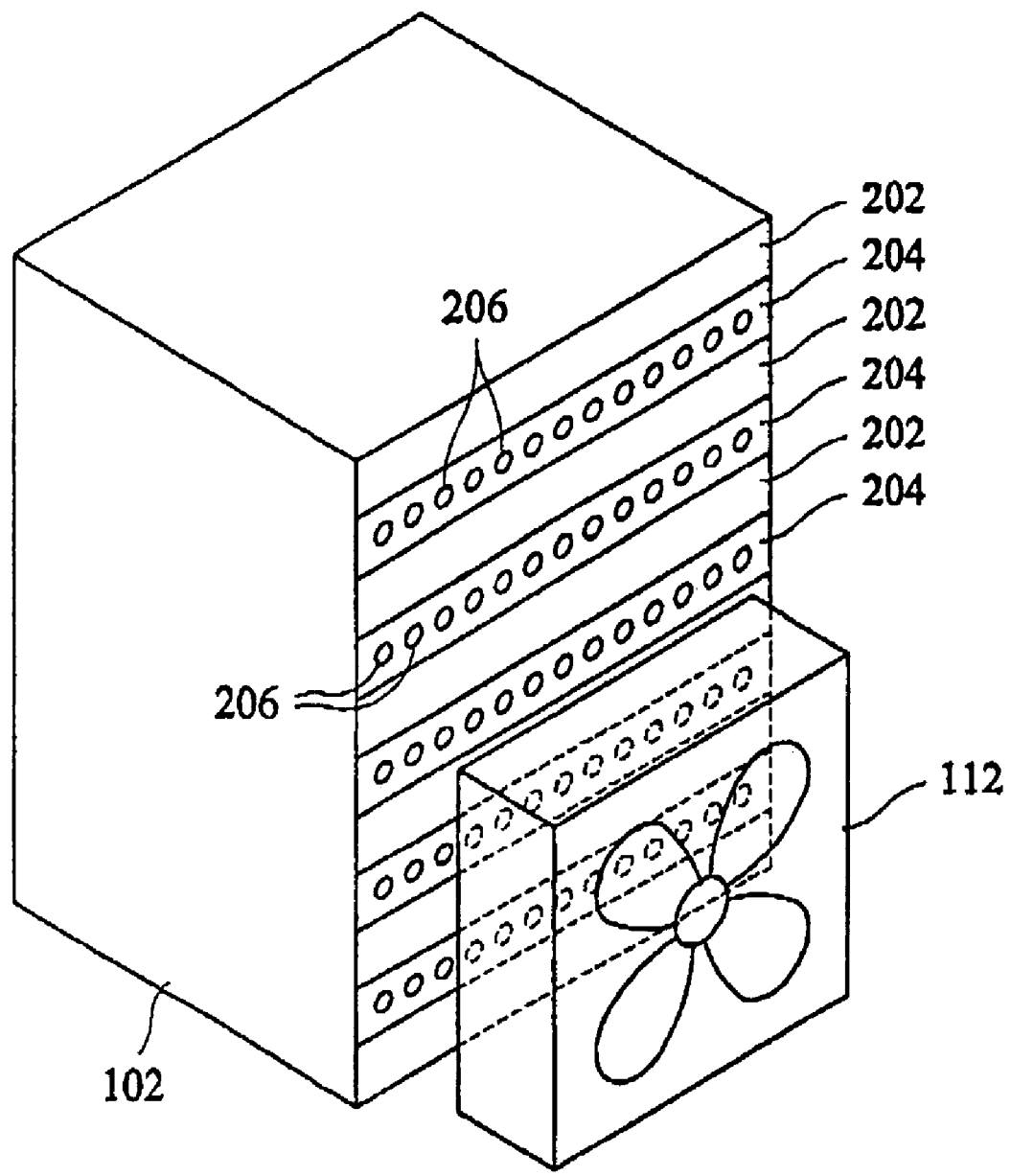
FIG. 2 is a perspective view of a conventional fuel cell system comprising a cooling fan.
Figure 3:
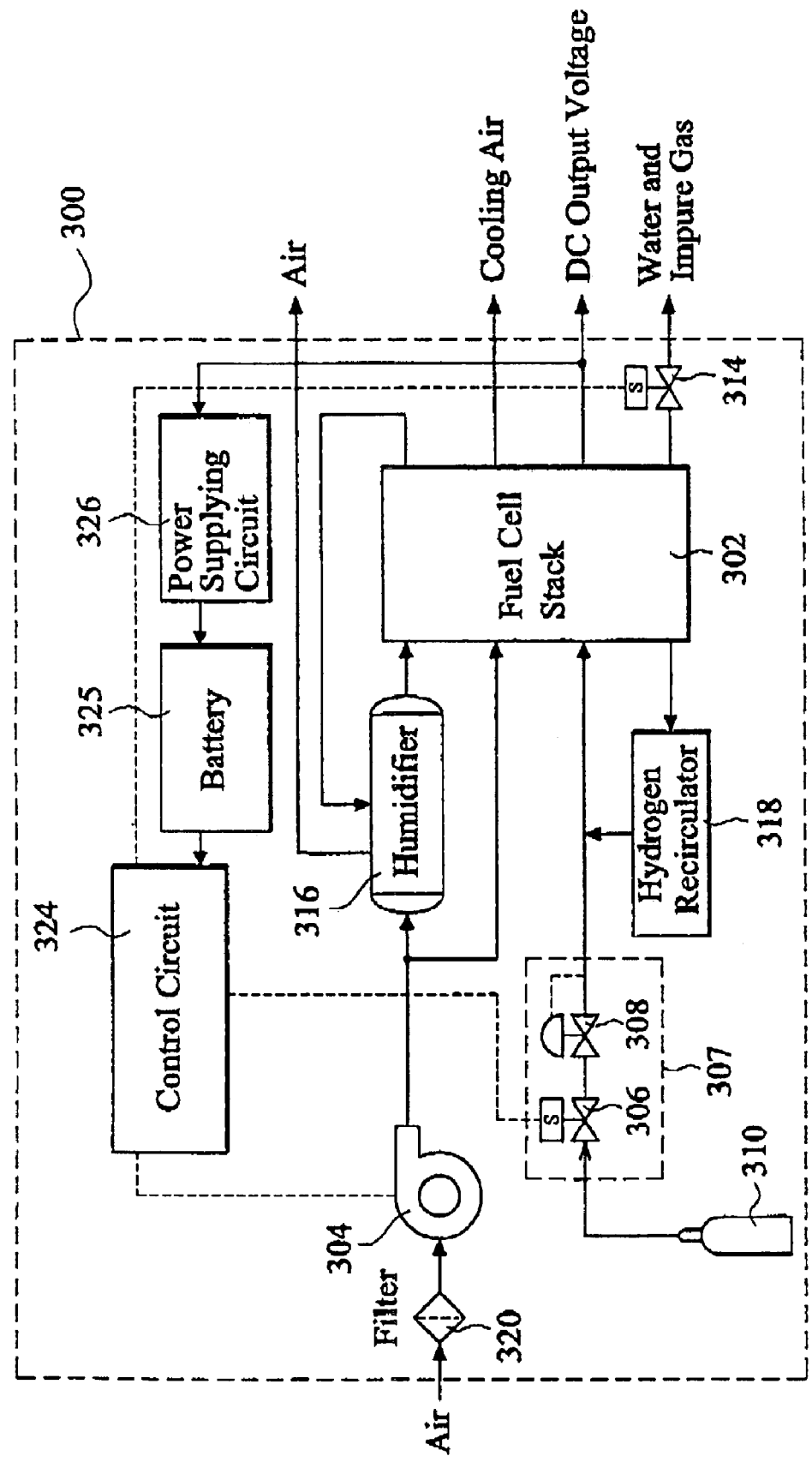
FIG. 3 is a system block diagram of a fuel cell system constructed in accordance with the present invention.

With reference to the drawings and in particular to FIG. 3, a low power fuel cell system in accordance with the present invention, generally designated with reference numeral 300, comprises a fuel cell stack 302, which receives hydrogen from a hydrogen storage 310 that may comprise an alloy based hydrogen canisters or pressurized hydrogen canister. The supply of the hydrogen from the hydrogen storage 310 to the fuel cell stack 302 is regulated by a flow and pressure regulating device 307. Also, a hydrogen recirculator 318 is connected to the fuel cell stack 302 for recirculation of hydrogen back into the fuel cell stack 302.

Air is drawn in by a blower 304 through an air filter 320. Impurities contained in the air are filtered by the filter 320. Part of the filtered air is conveyed directly via an air humidifier 316 to the fuel cell stack 302 and is used for reaction, while the other part of the filtered air is conveyed to the fuel cell stack for cooling the fuel cell stack 302.

Figure 4:
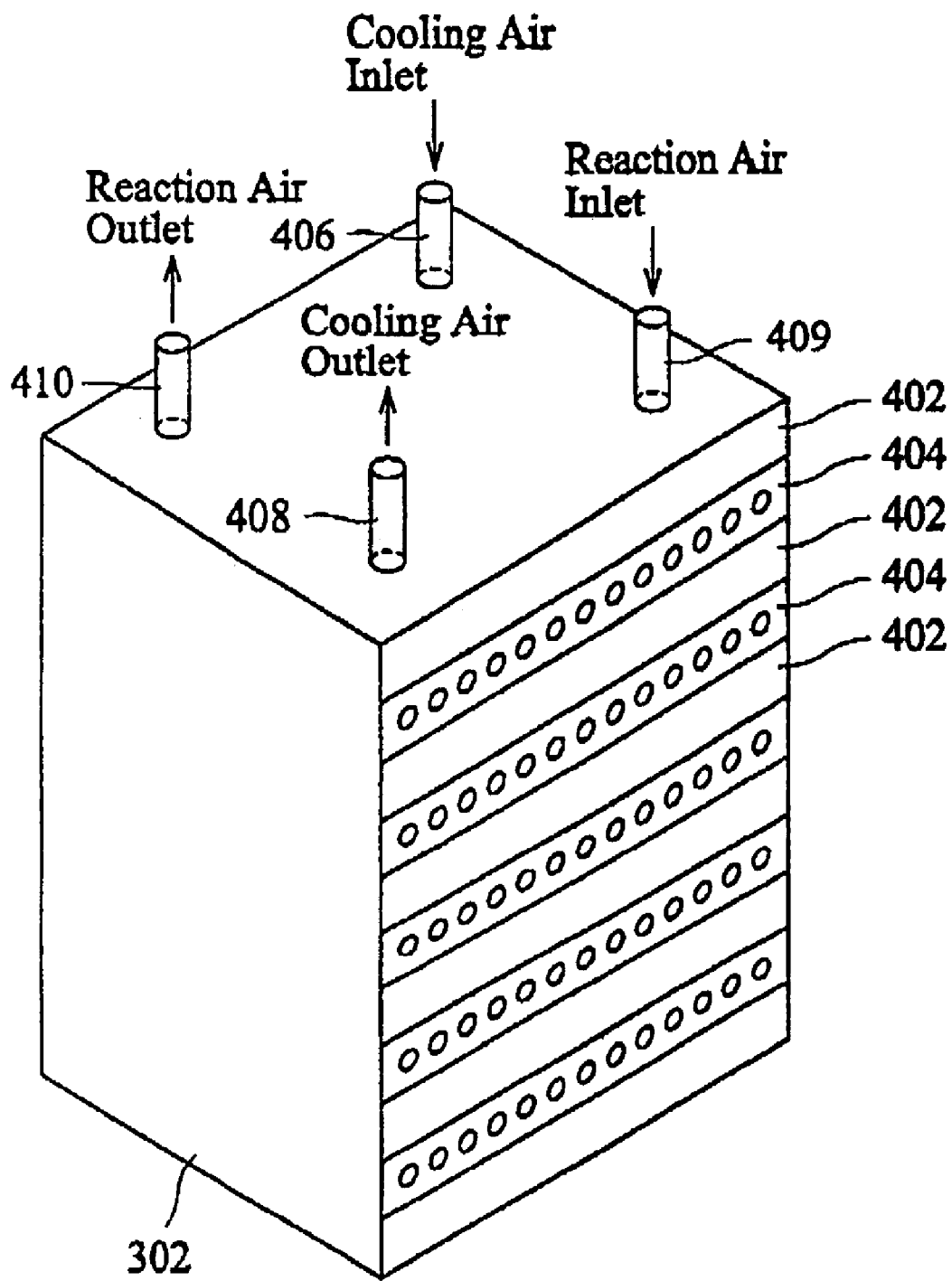
FIG. 4 is a perspective view of the fuel cell system constructed in accordance with the present invention.

As shown in FIG. 4, the fuel cell stack 302 includes a plurality of fuel cell units 402, each of which comprises an anode plate, a cathode plate, a membrane electrode assembly (MEA) and two gas diffusion layers at the two sides of MEA. Two adjacent cell units 402 sandwich a cooling plate 404 which comprises a plurality of parallelly arranged air grooves. The blower 304 drives the cooling air through a cooling air inlet 406 into the air grooves. The cooling air absorbs and carries away the heat in the fuel cell stack 302 and flows out from the cooling air outlet 408. When the load of fuel cell stack 302 is increased, a substantial quantity of heat is generated from the electrochemical reaction, and the temperature of the fuel cell stack 302 significantly rises. In this situation, the blower 304 will drive more cooling air into the fuel cell stack 302 to cool down the working temperature. Since the air flow generated by the blower 304 has high pressure and velocity, the heat dissipation effect of the cooling air is excellent. Thereby, the working temperature of the fuel cell stack 302 is effectively reduced, and no other cooling device e.g. a cooling fan is required. Hence, production cost and space are largely saved. Humid air from the air humidifier 316 is conveyed into the fuel cell stack 302 via a reaction air inlet 409 and air is conveyed out of the fuel cell stack 302 via a reaction air outlet 410.

The air humidifier 316 also receives reaction air from the fuel cell stack 302, which carries a great amount of moisture since water is continuously and rapidly generated by reaction in the fuel cell stack 302. The fresh air drawn in by the air blower 304 can absorb water from the humid air in the humidifier 316 to provide the outlet air with the desired humidity. The air is then fed into the fuel cell stack 302. The moisture contained in the outlet air effectively promotes the reaction in the fuel cell stack 302. Moreover, the recycle of humid air from the fuel cell stack 302 maintains the fuel cell stack 302 at an appropriate moisture content even at a temperature higher than 40~60° C., and hence the fuel cell stack may work at high performance Therefore, the fuel cell stack 302 is capable of working at heavy load and providing large working current with high performance.

The supply of hydrogen that is stored in the canister of the hydrogen storage 310 is controlled and regulated by the flow and pressure regulating device 307 which comprises a solenoid valve 306 and a pressure regulating valve 308. The solenoid valve 306 is controlled by a control circuit 324, such that it is selectively turned on or off for the flowing of the hydrogen from the hydrogen storage 310, while the pressure regulating valve 308 regulates the pressure of the hydrogen flowing through the solenoid valve 306 to the fuel cell stack 302.

The hydrogen recirculator 318 draws unreacted and excessive hydrogen from the fuel cell stack 302 and circulates the hydrogen back into the fuel cell stack 302. This induces a forced flowing of hydrogen through the fuel cell stack 302, and subsequently hydrogen is uniformly distributed. Thereby, the reaction between the hydrogen and the oxygen is promoted and the performance of the fuel cell is improved.

The exhaust valve 314, which may be a solenoid valve, is controlled by the control circuit 324 to remove undesired water and impurities from the fuel cell stack 302 at a regular interval. This maintains the purity of the hydrogen inside the fuel cell stack 302. Also, accumulation of water inside hydrogen passages of the fuel cell stack 302 can be eliminated in order to maintain the performance of the fuel cell stack 302.

The control circuit 324 electrically controls the operation of the flow and pressure regulating device 307 to regulate the hydrogen flowing into the fuel cells stack 302. The control circuit 324 also electrically controls the blower 304 to regulate the air flowing to the air humidifier 316 and the fuel cell stack 302. The control circuit 324 electrically controls the exhaust valve 314 for expelling impurities and water from the fuel cell stack 302. In addition, the control circuit 324 may conduct a self-diagnosis, such as detection of the hydrogen pressure of the hydrogen storage 310, and examination of the operation conditions of the blower 304, the solenoid valve 306, the exhaust valve 314, the fuel cell stack 302 and, if desired, the control circuit 324 itself.

A backup battery set 325 may be incorporated in the fuel cell system 300 for powering the control circuit 324 in starting up the fuel cell system 300. The backup battery set 325 may comprise a lead-acid battery or the like, which supplies electricity to the control circuit 324 when the fuel cell system 300 is started. The power of the backup battery 325 is also supplied to other devices, such as the blower 304, the solenoid valve 306 and the exhaust valve 314 for the startup operation. Once the fuel cell system 300 is properly started, electricity supplied from the fuel cell stack 302 recharges the backup battery set 325 via a power supplying circuit 326 to maintain future operability of the backup battery set 325. The power supplying circuit 326 converts the DC output voltage from the fuel cell stack 302 into a working voltage for the control circuit 324 and the backup battery set 325.

Figure 5:
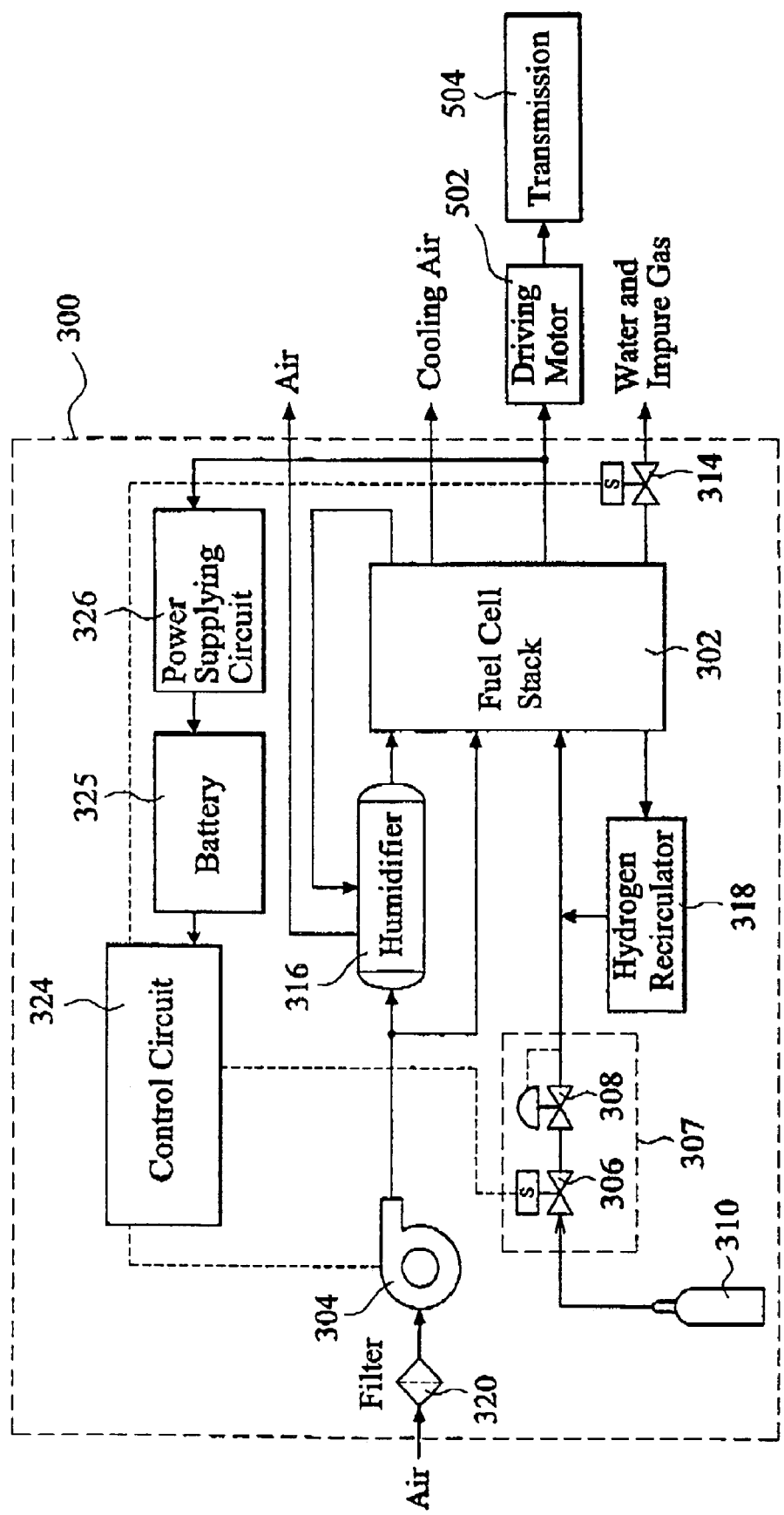
FIG. 5 is a block diagram of an application of the fuel cell system of the present invention in an electrical vehicle.

Fuel cell power system of power smaller than 1 kilo-watt is simple in structure and inexpensive. It is usually applied in applications requiring low power, such as electrical vehicles and low power generators. FIG. 5 shows an application of the fuel cell system 300 of the present invention in an electrical vehicle wherein the fuel cell stack 302 of the fuel cell system 300 generates a DC output voltage, which is applied to a driving motor 502 for driving a transmission 504 of the electrical vehicle. It is noted that the components and parts of the fuel cell system 300 of the present invention that is illustrated in FIG. 3 are completely incorporated in FIG. 5 for clarity.

Figure 6:
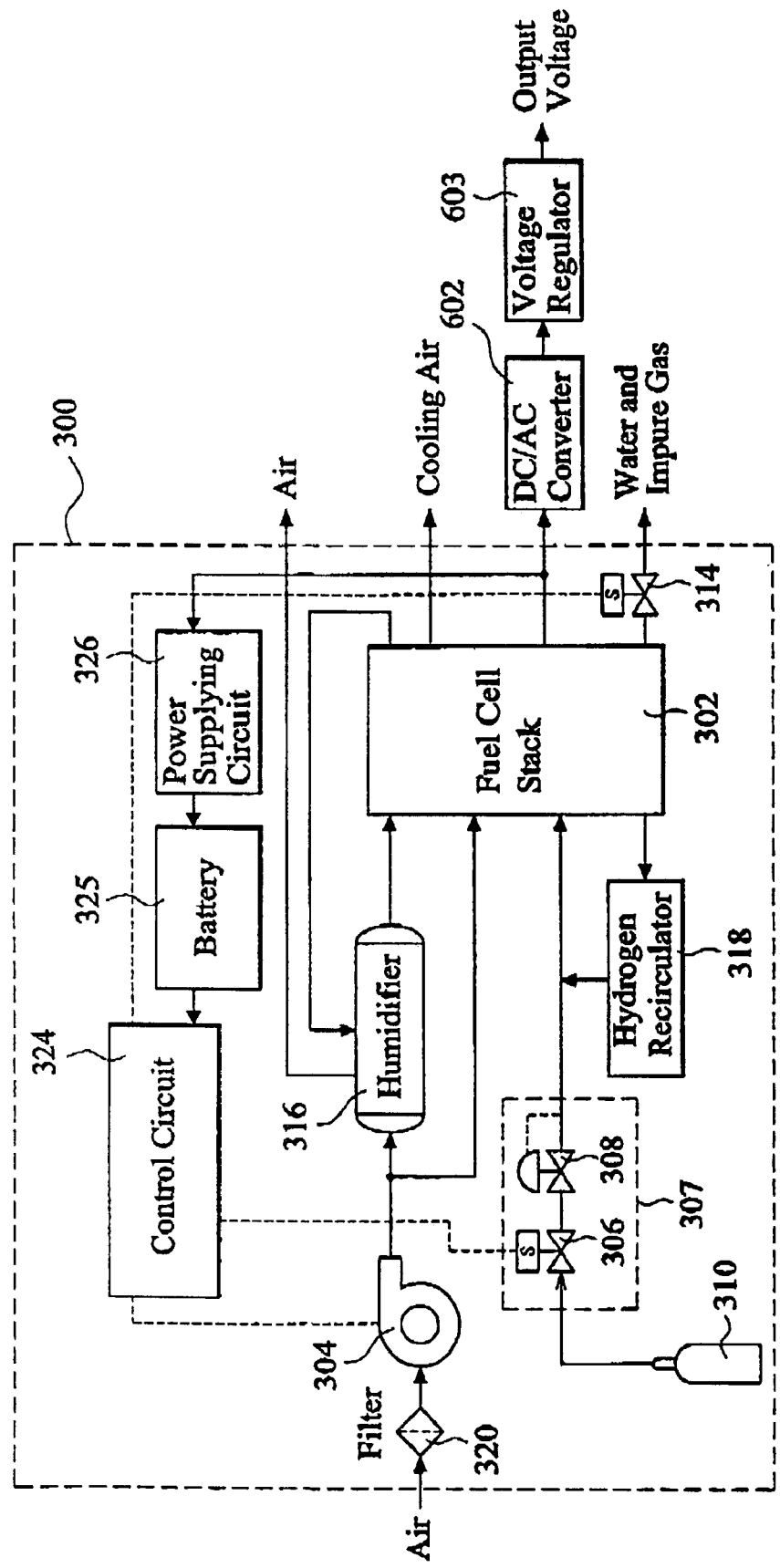
FIG. 6 is a block diagram of another application of the fuel cell system of the present invention in an alternating current power generation system.

FIG. 6 shows another application of the fuel cell system 300 of the present invention in an alternating current power generator, which may be portable or stationary. The fuel cell stack 302 of the fuel cell system 300 generates a DC output voltage, which is applied to a DC-to-AC converter 602 for converting the DC output voltage generated by the fuel cell stack 302 into an AC output voltage. The alternating current outputted from the DC-to-AC converter 602 flows through a voltage regulator 603 for voltage regulation. Frequency of the alternate current so generated may be changed as desired e.g. 60/50 Hz. It is noted that the components and parts of the fuel cell system 300 of the present invention that is illustrated in FIG. 6 are completely incorporated in FIG. 3 for clarity.

Figure 7:
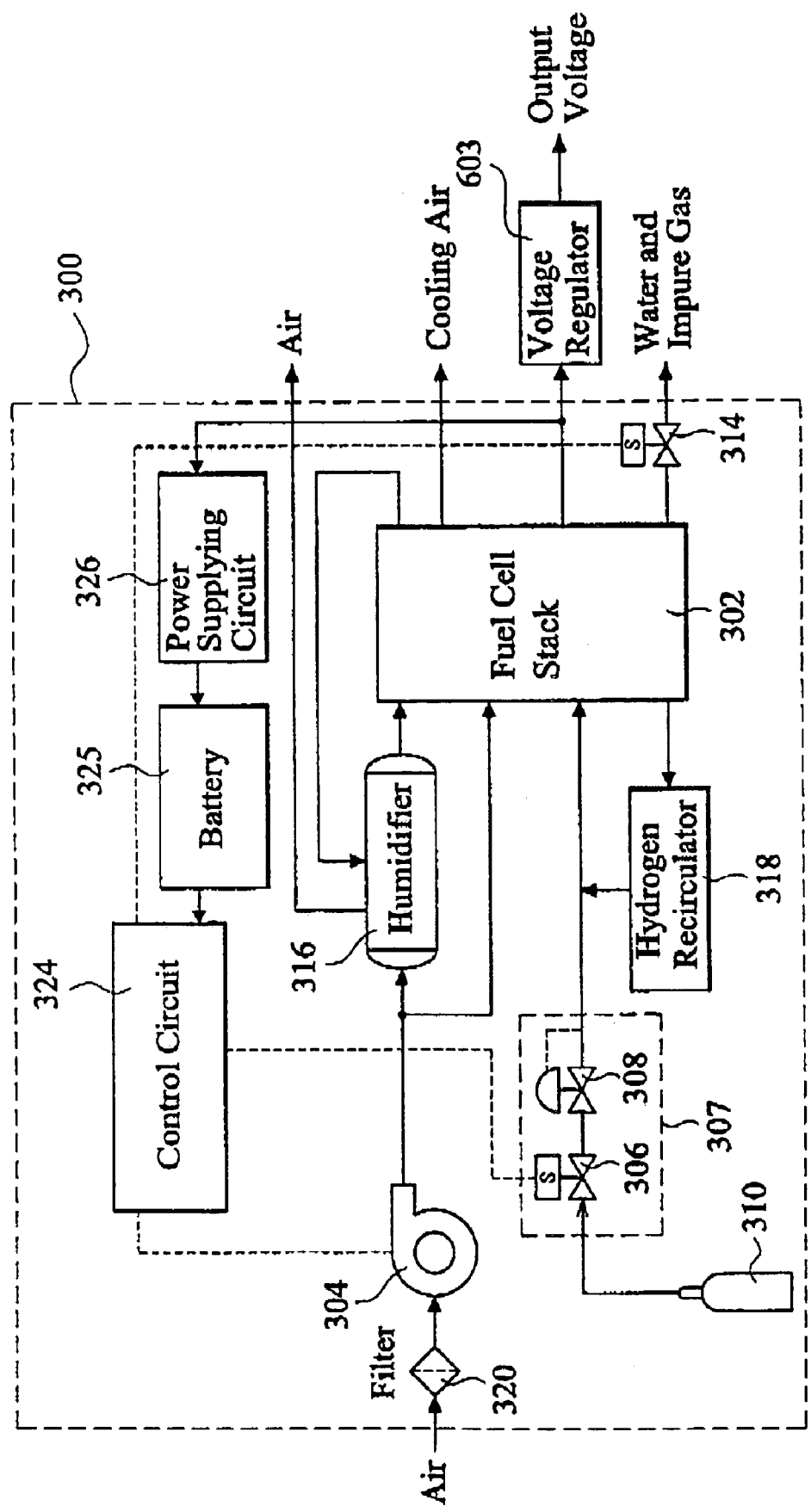
FIG. 7 is a block diagram of a further application of the fuel cell system of the present invention in a direct current power generation system.

FIG. 7 shows a further application of the fuel cell system 300 of the present invention in a direct current power generator, which may be portable or stationary. The fuel cell stack 302 of the fuel cell system 300 generates a DC output voltage, which is directly applied to a voltage regulator 603 for voltage regulation. It is noted that the components and parts of the fuel cell system 300 of the present invention that is illustrated in FIG. 7 are completely incorporated in FIG. 3 for clarity.

To this point, it can be noted that the fuel cell system of the present invention provides humidified air containing oxygen to the fuel cell stack for enhancing the reaction and to avoid insufficiency of water in case of heavy loads. It is also noted that the recirculation of the hydrogen back to the fuel cell stack helps promoting electro-chemical reaction inside the fuel cell stack. Part of the air drawn in by the blower is conveyed directly to the fuel cell stack for cooling down of the temperature, and hence no cooling device such as cooling fan is required.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A fuel cell system comprising:
   a fuel cell stack;
   an air supply system supplying an air flow to the fuel cell stack, comprising a blower for driving the air to a cooling air inlet of the fuel cell stack for cooling the fuel cell stack and to an air humidifier for humidifying the air supplied to the fuel cell stack;
   a hydrogen supply system supplying hydrogen to the fuel cell stack, comprising a hydrogen storage in which hydrogen is stored and from which a hydrogen flow is supplied to the fuel cell stack, and a pressure regulating device for regulating the hydrogen flow, a hydrogen recirculator for receiving an excessive hydrogen from the fuel cell stack and forcing the hydrogen back into the fuel cell stack in order to induce a hydrogen flow circulation inside the fuel cell stack; and a control circuit electrically controlling the flow and pressure regulating device for regulating the hydrogen flow toward the fuel cell stack and electrically controls the blower to regulate the air flows to the fuel cell stack and the air humidifier.

2. The fuel cell system as claimed in claim 1 further comprising:
   a battery set for powering the control circuit;
   a power supplying circuit for receiving and converting a DC output voltage from the fuel cell stack into a working voltage for powering the control circuit and charging the battery set;
   an exhaust valve controlled by the control circuit to expel impurities and water from the fuel cell stack; and
   a filter for removing impurities from the air drawn in by the blower.

3. The fuel cell system as claimed in claim 2, wherein the exhaust valve comprises, a solenoid valve.

4. The fuel cell system as claimed in claim 1, wherein the air humidifier receives an excessive humidity from the fuel cell stack and transfer the water to the air drawn by the air blower.

5. The fuel cell system as claimed in claim 1, wherein the hydrogen storage comprises an alloy based hydrogen storage canister.

6. The fuel cell system as claimed in claim 1, wherein the flow and pressure regulating device comprises:
   a solenoid valve controlled by the control circuit for selectively shutting down the hydrogen flow; and
   a pressure regulating valve for regulating the pressure of the hydrogen flow.

7. The fuel cell system as claimed in claim 1, wherein the control circuit furthers performs a self-diagnosis procedure.

8. The fuel cell system as claimed in claim 7, wherein the self-diagnosis procedure comprises detection of the hydrogen pressure of the hydrogen storage and examination of the operation conditions of the blower, the fuel cell stack and the control circuit.

9. The fuel cell system as claimed in claim 1, wherein the fuel cell stack generates a DC output voltage that is adapted to be applied to a driving motor of an electrical vehicle.

10. The fuel cell system as claimed in claim 1, wherein the fuel cell stack generates a DC output voltage that is adapted to be applied to an alternating current power generation system comprising a direct current to alternating current converter and a voltage regulator.

11. The fuel cell system as claimed in claim 1, wherein the fuel cell stack generates a DC output voltage that is adapted to be applied to a direct current power generation system comprising a voltage regulator.

* * * * *